United States Patent [19]
Morioka

[11] Patent Number: 4,931,817
[45] Date of Patent: Jun. 5, 1990

[54] STEREOPHOTOGRAPHIC PROCESS AND PROCESSING APPARATUS FOR PRODUCING WORKS OF SCULPTURE

[75] Inventor: Kimihiko Morioka, Tokyo, Japan

[73] Assignee: Rittaishashinzo Co., Ltd., Tokyo, Japan

[21] Appl. No.: 260,925

[22] Filed: Oct. 20, 1988

[30] Foreign Application Priority Data

Oct. 27, 1987 [JP] Japan ................................ 62-270926

[51] Int. Cl.[5] ........................ G03B 35/08; B44C 3/06; G02B 27/22

[52] U.S. Cl. .................................... 354/113; 350/130; 156/58

[58] Field of Search ........................ 350/130, 136, 320; 354/113; 156/58

[56] References Cited

U.S. PATENT DOCUMENTS

| | | | |
|---|---|---|---|
| 891,013 | 6/1908 | Smith | 354/113 |
| 3,085,923 | 4/1963 | Agnew | 156/58 |
| 3,185,602 | 5/1965 | Morioka | 156/58 |
| 3,544,402 | 12/1970 | Agnew | 156/58 |
| 3,580,758 | 5/1971 | Morioka | 156/58 |
| 4,239,359 | 12/1980 | Morioka | 354/113 |

OTHER PUBLICATIONS

D. E. Velkley et al., "Stereo-Photogrammetry . . . ", *Med. Phys.*, 6(2), Mar./Apr. 1979, pp. 100-104.

*Primary Examiner*—Jon W. Henry
*Attorney, Agent, or Firm*—McGlew & Tuttle

[57] ABSTRACT

The present invention is related to the provision of an improvement in a process for producing works of sculpture on the basis of a stereophotographic process by arranging a plurality of photogrpahic cameras and a plurality of optical projectors, each being loaded with a transparent screen having a plurality of parallel lines therein, around an object to be photographed at a predetermined object distance, arranging another plurality of projectors operatively around a mass of material to be modeled at such an operative distance of projection that they may be located in a similar position to that of each of the cameras to project the screen therefrom onto the object to take a photographic picture of a striped pattern in the screen projected onto the object, loading the projector with thus-taken picture to be projected onto the mass of material to be modeled, and modeling manually the mass of material to make the projected lines meet and coincide with each other as appeared thereon and to obtain a similar sized sculptural work to the object; a procsss for producing works of sculpture on a reduced scale which comprises the steps of setting to reduce distance of projection and a focal length of each of the lenses of the plurality of projectors directed to the object and loaded with the picture accordingly to the desired scale of reduction with respect to the object to be sculptured, and preparing the picture of striped pattern projected upon the object to be reduced accordingly to the scale of reduction to be loaded onto the projector.

2 Claims, 4 Drawing Sheets

STEREOPHOTOGRAPHIC PROCESS AND PROCESSING APPARATUS FOR PRODUCING WORKS OF SCULPTURE

FIELD OF THE INVENTION AND RELATED ART STATEMENT

The present invention relates to a stereophotographic process of and processing apparatus for producing works of sculpture.

One of the typical stereophotographic processes known in the art for this purpose of producing a stereoscopic sculpture is now shown by way of example with reference to the accompanying drawings, FIGS. 5 through 7.

In general, a common method of producing stereoscopic or three-dimensional sculptures is comprised of a stereophotographic process and a sculpture manufacturing process.

In the stereophotographic process, there is employed, for instance, such an arrangement of stereophotographic processing apparatus as designated generally at a reference numeral 1 in FIG. 5(I).

This stereophotographic processing apparatus 1 is seen comprising in construction a nearly letter C-shaped frame in symmetrical shape designated at 2, seven photographic cameras at $C_1$, $C_2$, $C_3$, $C_4$, $C_5$, $C_6$, $C_7$, and three units of projectors at $P_1$, $P_2$, $P_3$, which are all arranged as shown. In this specific arrangement, the reference characters $C_1$ through $C_7$ and $P_1$ through $P_3$ not only represent a group of photographic cameras and a group of projectors, respectively, but also represent typically the optical lenses per se belonging to these components for convenience in the description to follow.

Referring more specifically to this arrangement, it is seen that the camera $C_4$ is disposed in the center position of the frame 2, and also that the other cameras $C_3$, $C_2$, $C_1$ and $C_5$, $C_6$, $C_7$ are disposed discretely along the frame 2 in a symmetrical relationship with respect to the central camera $C_4$. Also, the projectors $P_1$ and $P_2$ are seen disposed in the neighborhood of the cameras $C_1$ and $C_7$ in a symmetrical relationship with respect to the projector $P_2$ which is disposed in the neighborhood of the central camera $C_4$, respectively. In addition, there is disposed, for example, a person to be photographed as an object 3 in the open mouth area of the frame 2, facing towards the central camera $C_4$, which person is shown to be a sphere for clarity in representation. Further to the location of this object or person 3, it is to be noted that the cameras $C_1$ through $C_7$ and the projectors $P_1$ through $P_3$ are disposed concentering at a specific point $O_1$ which is slightly before the person to be photographed, as seen schematically in the figure.

Each of the projectors $P_1$ through $P_3$ is fitted with a screen 4*a* with a number of lines running vertically in parallel or stripes $S_1$, $S_2$, , , $S_n$ as shown in FIG. 6 (II), and the projectors are operated to throw striped patterns from the screens 4*a* onto the object to be photographed 3. On and around the surface of the object 3, there are projected the striped patterns 4*b* as shown in FIG. 6 (II), and the object 3 projected with such striped patterns thereon is then photographed all at once by the group of cameras $C_1$ through $C_7$ arranged around the object to obtain photographic pictures in negative and/or positive (hereinafter, referred to as "pictures" for convenience in the description).

Now, referring to the sculpture manufacturing process which is another part comprising the method of producing stereoscopic or three-dimensional sculptures, as typically shown in FIG. 5(II), there is employed an apparatus 6 for producing solid sculptures which comprises a plurality of projectors $P_{11}$ through $P_{17}$ corresponding in quantity to the photographic cameras $C_1$ through $C_7$ to replace them and disposed in the corresponding locations for cameras existing along the extension of the frame 5. Next, the photographed object 3 is replaced on the same location with a mass of material 7, for example, a lump of clay for the preparation of an original form for a stereoscopic sculpture on the same location.

In this specific arrangement, the reference characters $P_{11}$ through $P_{17}$ not only represent a group of projectors, respectively, but also represent typically the optical lenses per se belonging to these projectors for convenience in the description to follow.

These projectors $P_{11}$ through $P_{17}$ are loaded with the photographic pictures taken by the group of cameras $C_1$ through $C_7$ disposed in the same positions, respectively. These pictures contain the scenes of projection on and around the outer shape in the surface of the object 3 such that the patterns 4*b* having the plurality of parallel lines $S_n$ of the screens 4*a* projected from the projectors $P_1$ through $P_3$ are deformed accordingly to its outer surface configuration, when projected thereupon in the previous photographing process (see FIG. 6(II)).

When these pictures are projected onto the outer surface of the mass of material 7 from the projectors $P_{11}$ through $P_{17}$ noted above, there are seen a plurality of shadow lines or stripes which correspond accordingly to the parallel lines $S_n$ of the screen 4*a*. Then, a next step is to adjust the surface configuration of the mass of material 7 by removing or adding an appropriate amount of material from the surface thereof in such a manner that each of such shadow lines or stripes projected separately from each of the projectors may coincide with each other on the outer surface thereof. When each of the shadow lines or stripes may exactly meet with each other on the surface of the mass of modeling material 7, there is now attained a finish in the modeling of the material 7 with a satisfactory expression in similarity or resemblance with the object 3 to follow. This is a typical example known in the art to produce a stereoscopic sculpture of an object by way of the stereophotographic process.

Now, in the above description, while different frames 2 and 5 were put to use in the stereophotographic process and the sculpture producing process for convenience, operators may use one and the same frame in the both process, and in this case, they will naturally take the trouble to replace the groups of cameras $C_1$ through $C_7$ and projectors $P_1$ through $P_3$ with the other group of projectors $P_{11}$ through $P_{17}$, when shifting from the stereophotographic process to the sculpture processing process, accordingly. Or else, you may use another group of projectors mounted on a given means instead of using the frame 5 to an equal effect.

Incidentally, giving an idea of dimensions of the frame 2 with the stereophotographic processing apparatus 1, the following is an example.

If the both ends of the frame 2 are designated at A and B, with the corners C and D in the curved extension, $\overline{AC}=\overline{BD}=1036$ mm; $\overline{DC}=496$ mm; $\overline{C_1O_1}=$-

$\overline{C_7O_1}$=650 mm; $\overline{C_2O_1}$=$\overline{C_6O_1}$=530 mm; $\overline{C_3O_1}$=-$C_5O_1$=670 mm; and $\overline{C_4O_1}$=800 mm, respectively.

In this apparatus, it is assumed that the focal length of the lens of each of the cameras $C_1$, $C_2$, $C_6$, $C_7$, and of the projectors $P_1$, $P_3$ is 50 mm, and that the focal length of the lens of each of the cameras $C_3$, $C_4$, $C_5$, and the projectors $P_2$ is 75 mm, respectively.

Also, it is assumed that the focal length of the lens used in each of the projectors $P_{11}$, $P_{12}$, $P_{16}$, $P_{17}$ is 50 mm, and that of the lens employed in each of the projectors $P_{13}$, $P_{14}$, $P_{15}$ is 75 mm, respectively.

More specifically, it is notable that the lens with the same focal length is used for the components such as those cameras $C_1$ through $C_7$ and the projectors as those projectors $P_1$ through $P_3$ and $P_{11}$ through $P_{17}$ disposed in the corresponding positions for the stereophotographic process and the sculpture processing process.

This is the case for producing a stereoscopic sculpture with the life size from the object 3 by way of the stereophotographic process. Besides, it is require sometimes to make a sculpture with a reduced scale of, for instance, 80%, 50% or 40% of the object 3.

For this purpose, it is contemplated that a 50% down-scaled positive is produced from the original pictures taken by the group of cameras $C_1$ through $C_7$, and that thus-obtained reduced scale positive, the frame 5 for producing the conventional life-size stereoscopic sculpture and the group of projectors $P_{11}$ through $P_{17}$ disposed on this frame are used to obtain a 50% down-scaled sculpture. However, with this method wherein there is a long distance between the group of projectors $P_{11}$ through $P_{17}$ and the mass of material 7, it was so difficult in practice to make an adjustment to have the striped patterns 4*b* meet and coincide with each other as appearing when projected upon the material from each of the projectors $P_{11}$ through $P_{17}$, and consequently, this method has not been employed in practice.

In this respect, therefore, it is the common practice in the conventional process to reduce the distance from each of the projectors $P_{11}$ through $P_{17}$ to the point $O_1$ in the stereoscopic sculpture producing process, if necessary. In this manner, when it is required to have a sculpture reduced to a 50% or more down-scale, as it is difficult to obtain a sufficient working space 8 between the frame 5 and the mass of material 7 large enough for the operator to stand in, the operator would then have to once step out of the working space 8 and make an adjustment work from the outside of the frame 5.

With this arrangement, while it is advantageously feasible in practice to make the size of the frame 5 smaller accordingly to a required scale of reduction on the part of a sculpture, it would inevitably make the projectors $P_{11}$ through $P_{17}$ greater in relative dimensions to the frame, which may possibly obstruct a sculpture work, and which would bring a difficulty for the operator while performing his job for adjustment from the outside of the frame 5.

Here now is a definite description on the practice of a sculpture producing work reduced in scale down to 50% with reference to FIG. 7, in comparison with the production of a life-size sculpture.

Now, assuming that the focal length of the lens employed in the projectors $P_{11}$ through $P_{17}$ is designated "f" and that the distance from the lens to the point $O_1$ is defined "a" and the distance from the lens to the picture 9 of the object 3 shown in FIG. 6(II) is defined "b", respectively, there is obtained the following relationship in terms of equation;

$$\frac{1}{a} + \frac{1}{b} = \frac{1}{f}$$

With this equation, the distances a and b in each of the projectors $P_{11}$ through $P_{17}$ may be obtained, as follows.

(1) For a life-size sculpture

The dimensions of the frame 5 for mounting the projectors $P_{11}$ through $P_{17}$ is as large as the one used in the stereophotographic processnoted hereinbefore.

The distance b may be obtained as follows.

(i) For the projector $P_{14}$

With a=800 mm and f=75 mm;

$$\frac{1}{800} + \frac{1}{b} = \frac{1}{75} \text{ then, } b = 82.76 \text{ mm}$$

then, b=82.76 mm (ii) For the projectors $P_{13}$ and $P_{15}$

With a=670 mm and f=75 mm;

$$\frac{1}{670} + \frac{1}{b} = \frac{1}{75} \text{ then, } b = 84.45 \text{ mm}$$

then, b=84.45 mm (iii) For the projectors $P_{12}$ and $P_{16}$

With a=530 mm and f=50 mm;

$$\frac{1}{530} + \frac{1}{b} = \frac{1}{50} \text{ then, } b = 55.21 \text{ mm}$$

then, b=55.21 mm (iv) For the projectors $P_{11}$ and $P_{17}$

With a=650 mm and f=50 mm;

$$\frac{1}{650} + \frac{1}{b} = \frac{1}{50} \text{ then, } b = 55.21 \text{ mm}$$

then, b=55.12 mm (2) For a 50% down-scale sculpture The dimensions of the frame 10 for mounting the projectors $P_{11}$ through $P_{17}$ is half as large as the one used in the stereophotographic process taken previously. In this case, the distance "b" is obtained as follows. Taking a ratio of "c" with respect to the distance "b" for the life-size sculpture, c may be obtained as follow.

(i) For the projector $P_{14}$

With a=400 mm and f=75 mm;

$$\frac{1}{400} + \frac{1}{b} = \frac{1}{75} \text{ then, } b = 92.31 \text{ mm}$$

then, b=92.31 mm c=92.31/82.76=1.115

(ii) For the projectors $P_{13}$ and $P_{15}$

With a=335 mm and f=75 mm;

$$\frac{1}{335} + \frac{1}{b} = \frac{1}{75} \text{ then, } b = 96.63 \text{ mm}$$

then, b=96.63 mm c=96.63/82.76=1.114

(iii) For the projectors $P_{12}$ and $P_{16}$

With a=265 mm and f=50 mm;

$$\frac{1}{265} + \frac{1}{b} = \frac{1}{50} \text{ then, } b = 61.34 \text{ mm}$$

then, b=61.34 mm c=61.34/55.21=1.111

(iv) For the projectors $P_{11}$ and $P_{17}$

With a=325 mm and f=50 mm;

$$\frac{1}{325} + \frac{1}{b} = \frac{1}{50} \text{ then, } b = 59.09 \text{ mm}$$

then, b=59.09 mm c=59.09/54.17=1.091

As is apparent from the example above, in the case with the reduction scale of 50%, though the overall size of the frame 10 is half as large as the frame 5, the distance b in connection with the projectors $P_{11}$ through $P_{17}$ has no substantial difference in comparison with the case for the life-size sculptural work.

This means that the relative size of the projectors $P_{11}$ through $P_{17}$ is substantial with respect to the frame extension which are disposed extending to a substantial extent out of the area defined by the frame 10. This was one of the disadvantageous factors in the manual operation taken by the operator to reach the mass of material 7 placed in the center of the working area from the outside thereof.

Also, for the case of 50% down-scale sculpture, there may exist a substantial variation in the ratio "c", it was required in practice to prepare positives taken by the cameras $C_1$ through $C_7$ for a reduced sculpture by modifying them so that they may well fit each of the projectors $P_{11}$ through $P_{17}$. However, these positives may differ for each of the projectors $P_{11}$ through $P_{17}$ accordingly with differences in the rate of enlargement which may occur from differences in the ratio "c", and consequently, they cannot be used commonly for all these projectors, thus requiring them to be prepared separately. This may undoubtedly cause a substantial trouble in the preparation of such positives, thus making one of the causes that a scaled-down sculpture work cannot escape a poor productivity.

In addition, there is a problem such that a thinner sculpture may possibly be obtained by way of the conventional method in comparison with the case of life-size sculptural work.

3. Object and Summary of the Invention

In consideration of such drawbacks which have been inevitable in the conventional process, it would be desirable to attain an efficient solution therefor.

The present invention is essentially directed to the provision of a useful solution to such a difficulty in practice as referred to above and experienced in the conventional stereophotographic process for producing works of sculpture.

Therefore, it is a primary object of the present invention to provide an improved stereophotographic process for producing a stereoscopic sculpture with a reduced scale, more specifically with a reduction ratio of 50% or more to an original object to be sculptured.

The present invention is directed to the provision of the improvement to attain the object stated above in, as summarized in brief, a process of producing a stereoscopic sculptural work on the basis of a stereophotographic process by arranging a plurality of photographic cameras and a plurality of optical projectors, each being loaded with a transparent screen having a plurality of parallel lines therein, around an object to be photographed at a predetermined object distance, arranging another plurality of projectors operatively around a mass of material to be modeled at such an operative distance of projection that they may be located in a similar position to that of each of the cameras to project the screen therefrom onto the object to take a photographic picture of a striped pattern in the screen projected onto the object, loading the projector with thus-taken picture to be projected onto the mass of material to be modeled, and modeling manually the mass of material to make the projected lines meet and coincide with each other as appeared thereon and to obtain a similar sized sculptural work to the object; a process of producing a stereoscopic sculptural work on a reduced scale which comprises the steps of setting to reduce distance of projection and a focal length of each of the lenses of the plurality of projectors directed to the object and loaded with the picture accordingly to the desired scale of reduction with respect to the object to be sculptured, and preparing the picture of striped pattern projected upon the object to be reduced accordingly to the scale of reduction to be loaded onto the projector.

Additional features and advantages of the invention will now become more apparent to those skilled in the art upon consideration of the following detailed description of a preferred embodiment exemplifying a best mode of carrying out the invention as presently perceived. The detailed description refers particularly to the accompanying drawings, in which like parts are designated at like reference numerals.

4. BRIEF DESCRIPTION OF THE DRAWINGS

FIGS. 3 and 4 are like schematic views showing another embodiment of the invention, in which FIG. 3 is a conceptual view showing the manner to process a positive photographic picture and FIG. 4 is a like conceptual view showing the manner of producing a stereoscopic relief;

Figure 5I:
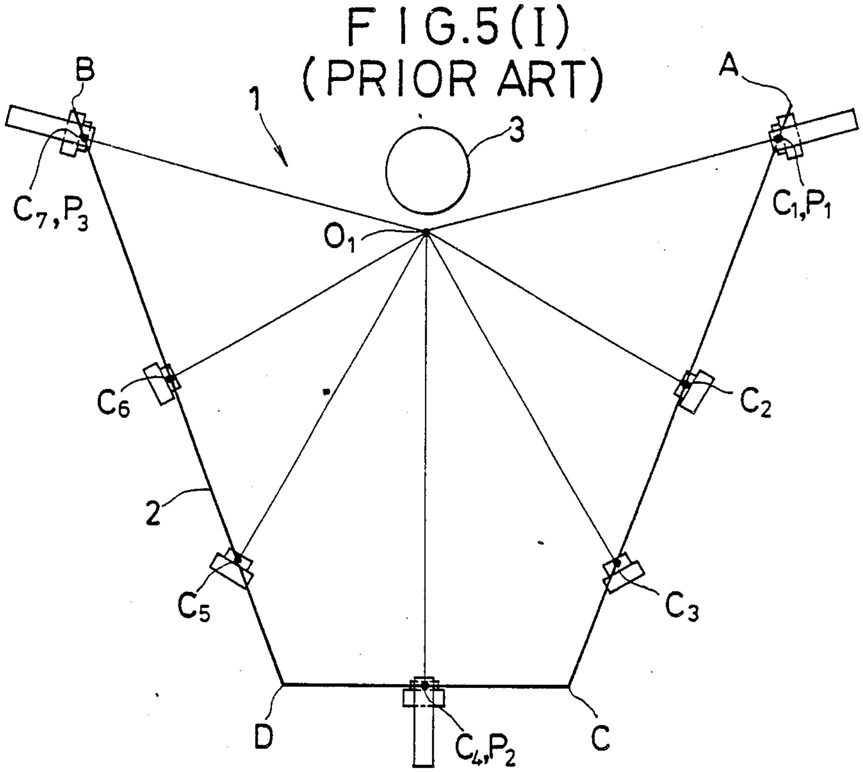
FIG.5(I) (PRIOR ART)
Figure 6I:
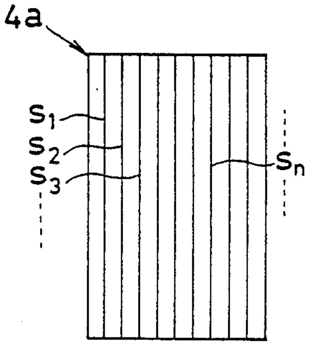
Figure 6:
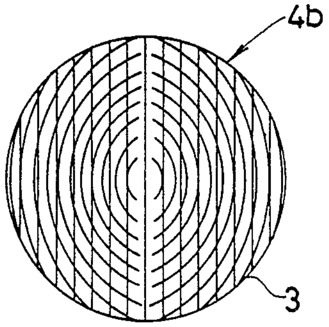
Figure 5:
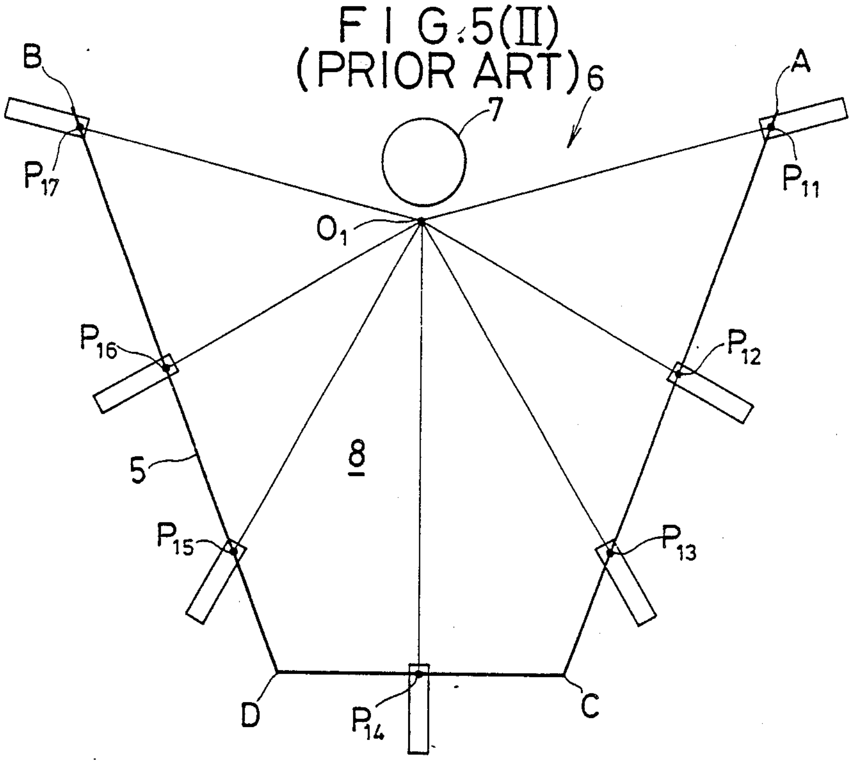
FIG. 5(II) (PRIOR ART)
Figure 7:
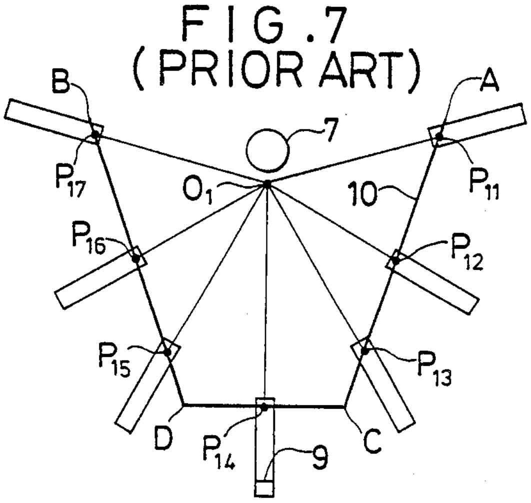
FIG. 7 (PRIOR ART)

FIGS. 5(I) and 5(II) are schematic top plan views showing conceptually the general construction of a stereophotographic arrangement of camera and sculptural apparatus employing the conventional stereoscopic sculpture;

FIG. 6 is a schematic view showing an example of a screen to be projected onto an object, and FIG. 7 is a schematic top plan view showing conceptually the general arrangement of a typical conventional sculpture producing process.

5. DETAILED DESCRIPTION OF PREFERRED EMBODIMENTS

The present invention will now be explained in detail on an improved stereophotographic process of producing a stereoscopic sculpture of a three-dimensional object by way of scales of reduction to 50% and 60% (hereinafter referred to as "50% sculpture" and "40% sculpture") as preferred embodiments thereof with reference to the accompanying drawings herewith.

Figure 1:
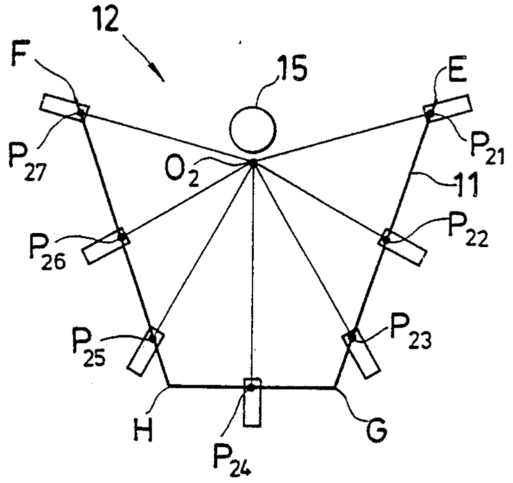
FIGS. 1 and 2 are schematic top plan views showing by way of a preferred concept the general construction of a stereophotographic arrangement of cameras and stereoscopic sculpture producing apparatus which employs the improved stereophotographic process according to the present invention.
Figure 2:
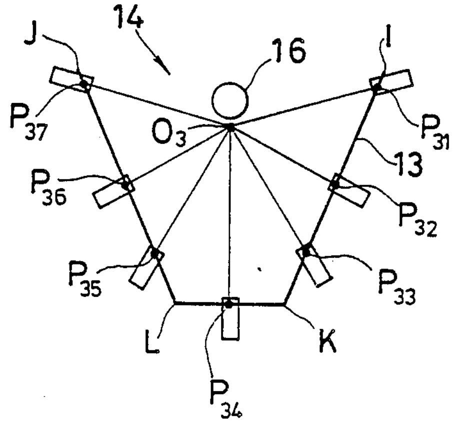

The following description in conjunction with FIG. 1 will be directed to the 50% sculpture, and the description with FIG. 2 will be concerned with the 40% sculpture.

Incidentally, the present method of producing works of sculpture by way of a preferred embodiment of the present invention is comprised of a stereophotographic process and a sculpture producing process as in the conventional process.

So far as the stereophotographic process is concerned, it may be conducted in all the same manner as the conventional process using the group of cameras 1, and therefore, no detailed description will be made in this connection (see FIG. 5(I)).

Referring now to the sculpture producing process by way of this embodiment to produce a 50% stereoscopic sculpture, firstly, a frame 11 is prepared proportionally to the shape of and accordingly to the scale of reduction to 50% on the part of the frame 2, and then there are disposed a group of projectors $P_{21}$ through $P_{27}$ in the corresponding locations for the group of cameras $C_1$ through $C_7$ so as to form a stereoscopic sculpture producing apparatus 12 (see FIG. 1). The lenses of these projectors $P_{21}$ through $P_{27}$ have a focal length half as long as that of the lenses of the cameras $C_1$ through $C_7$, respectively.

When producing a 40% sculpture, a frame 13 is prepared proportionally in shape of and accordingly to a scale of reduction of 60% with respect to the frame 2 for the stereophotographic process, and then, a group of projectors $P_{31}$ through $P_{37}$ is located operatively along the extension of the frame 13 in position corresponding to those for the group of cameras $C_1$ through $C_7$ of the stereophotographic apparatus 1, thus providing the stereoscopic sculpture producing apparatus 14 (see FIG. 2). Each of the lenses of these projectors $P_{31}$ through $P_{37}$ have a forcal length reduced to 60% of that of the lens of the corresponding one of the cameras $C_1$ through $C_7$, respectively.

Referring now to FIG. 1, the both end points of the frame 11 are designated "E" and "F", and the lower corners thereof are designated "G" and "H", and next to FIG. 2, the both end points of the frame 13 are designated "I" and "J", and the lower corners thereof are designated "K" and "L", respectively.

Also, the reference characters $P_{21}$ through $P_{27}$ and $P_{31}$ through $P_{37}$ are adapted to designate the projectors, as well as the lenses per se thereof, conceptually.

Moreover, there are seen reference points $O_2$ and $O_3$ in the frames 11 and 13 in the central position thereof corresponding to that of the point $O_1$, respectively. A mass of material is shown by the references 15 and 16.

Now, it is assumed referring to the 50% down scale that the focal length of each of the lenses of the projectors $P_{21}$, $P_{22}$, $P_{26}$, $P_{27}$, $P_{28}$ and $P_{30}$ is 25 mm, and the focal length of each of the lenses of the projectors $P_{23}$, $P_{24}$ and $P_{25}$ is 37.5 mm, respectively.

It is also assumed referring to the 60% down scale that the focal length of each of the lenses of the projectors $P_{31}$, $P_{32}$, $P_{36}$ and $P_{37}$ is 20 mm, while the focal length of each of the lenses of the projectors $P_{33}$, $P_{34}$ and $P_{35}$, respectively.

Now, assuming that the distance from the lens of each of the projectors $P_{21}$ through $P_{27}$ or $P_{31}$ through $P_{37}$ to the point $O_2$ or $O_3$ is a, and that the distance between each of these lenses and the picture or screen loaded in the projectors is b, there are obtained the distances a and b as follows, using the relationship as obtained from the equation;

$$\frac{1}{a} + \frac{1}{b} = \frac{1}{f}$$

Also, shown is a ratio "c" taken in proportion to the value of "b" in the case of a life-size sculpture manufacturing process.

(1) For a 50% sculpture

The dimensions are as follows; EG=FH=518 mm; $\overline{HG}$=248 mm; $\overline{P_{21}O_2}=\overline{P_{27}O_2}$=325 mm; $\overline{P_{22}O_2}=\overline{P_{26}O_2}$=265 mm; $\overline{P_{23}O_2}=\overline{P_{25}O_2}$=335 mm; $\overline{P_{24}O_2}=\overline{P_{27}O_2}$=400 mm (i) For the projector $P_{24}$ With a=400 mm and f=37.5 mm;

$$\frac{1}{400} + \frac{1}{b} = \frac{1}{37.5} \text{ then, } b = 41.38 \text{ mm}$$

then, b=41.38 mm
c=41.38/82.76=0.50

(ii) For the projectors $P_{23}$ and $P_{25}$

With a=335 mm and f=37.5 mm;

$$\frac{1}{335} + \frac{1}{b} = \frac{1}{37.5} \text{ then, } b = 42.23 \text{ mm}$$

then, b=42.23 mm
c=42.23/84.45=0.50

(iii) For the projectors $P_{22}$ and $P_{26}$

With a=265 mm and f=25 mm;

$$\frac{1}{265} + \frac{1}{b} = \frac{1}{25} \text{ then, } b = 27.60 \text{ mm}$$

then, b=27.60 mm
c=27.60/55.21=0.50

(iv) For the projectors $P_{21}$ and $P_{27}$

With a=325 mm and f=25 mm;

$$\frac{1}{325} + \frac{1}{b} = \frac{1}{25} \text{ then, } b = 27.08 \text{ mm}$$

then, b=27.08 mm
c=27.08/54.17=0.50

(2) For a 40% sculpture

The dimensions are as follows; $\overline{IJ}=\overline{KL}$=414.4 mm; $\overline{LJ}$=30 mm; $\overline{O_{32}O_3}$=212 mm; $\overline{P_{33}O_3}$=2680 mm; $\overline{P_{34}O_3}$=320 mm (i) For the projector $P_{34}$ With a=320 mm and f=30 mm;

$$\frac{1}{320} + \frac{1}{b} = \frac{1}{30} \text{ then, } b = 33.10 \text{ mm}$$

then, b=33.10 mm
c=33.10/82.76=0.40

(ii) For the projectors $P_{33}$ and $P_{35}$

With a=268 mm and f=30 mm;

$$\frac{1}{268} + \frac{1}{b} = \frac{1}{30} \text{ then, } b = 33.78 \text{ mm}$$

then, b=33.78 mm
c=33.78/84.45=0.40

(iii) For the projectors $P_{32}$ and $P_{36}$

With a=212 mm and f=20 mm;

$$\frac{1}{212} + \frac{1}{b} = \frac{1}{20} \text{ then, } b = 22.08 \text{ mm}$$

then, b=22.08 mm
c=22.08/55.21=0.40

(iv) For the projectors $P_{31}$ and $P_{37}$

With a=260 mm and f=20 mm;

$$\frac{1}{260} + \frac{1}{b} = \frac{1}{20} \text{ then, } b = 21.67 \text{ mm}$$

then, b=21.67 mm
c=21.67/54.17=0.40

As is apparent from the foregoing, the ratios as obtained for each of the group of projectors $P_{21}$ through $P_{27}$ and $P_{31}$ through $P_{37}$ are constant for each of the scales of reduction so specified, and moreover, the value b for each of the projectors decreases as the scale of reduction becomes smaller. For example, it is notable that each value b for producing 50% sculpture will be reduced to be 50% of or half as large as the value b for the production of a life-size sculpture, and that each value b for producing 40% sculpture will be reduced to be 60% less than or 40% of the value b for the production of a full-size sculpture, respectively. For this reason, the general arrangement of stereoscopic sculpture production apparatus 12 and 14 according to this invention will be made available with a substantially reduced size in the arrangement of projectors $P_{21}$ through $P_{27}$ and $P_{31}$ through $P_{37}$ accordingly to a specified scale of reduction, respectively. As a consequence, the arrangement of stereoscopic sculpture production apparatus 12 and 14 may turn to be a small and light arrangement such that it is readily portable to any desired location for use, and such that the arrangement of projectors may not obstruct any performances of operation in a stereoscopic sculptural work, and this advantage may stand out particularly when a scale of reduction of 50% or more is taken in the sculpture production, which may eventually contribute to a substantial improvement in the efficiency of sculptural work, accordingly.

With a constant ratio of c in any scale of reduction, a single set of positives may serve for the production of sculpture to a desired scale of reduction, which may then be used in a given group of projectors set on the frame for a desired scale.

In addition to the production of a stereoscopic sculpture, this arrangement can equally be adapted to the production of relief works, either.

More specifically, it may be arranged for this purpose that a third positive is prepared in the manner disclosed in Japanese Patent Publication No. 7,494/1974 prior to the loading of the pictures as taken by the arrangement of cameras 1 into the arrangement of stereoscopic sculpture production apparatus 12, 14, and then this third positive is projected in the manner as disclosed in this Japanese Patent Publication specification to obtain a relief work. In this connection, it is notable that the present invention may be adapted while projecting the third positive for the production of a relief work.

For more details of the production of a relief work, refer to Japanese Pat. Nos. 320,203; 676,163 and 1,076,791, etc.

Of course, it is needless to mention that any scales of reduction may be applied in practice for the production of a stereoscopic sculptural work.

Incidentally, referring further to the shape of a frame structure to be employed, it may not necessary to make the frame for use with a stereophotographic arrangement similar in shape with the one for a stereoscopic sculpture production arrangement, and so, what is required essentially is that the group of projectors of the sculpture production arrangement may be located in position corresponding in similarity to that for the group of cameras and projectors of the stereophotographic arrangement, and so, a frame structure may be prepared with any desired shape if it may satisfy this requirement, accordingly.

Now, reference is made further to the method of producing a relief work by using the arrangement according to this invention.

The term "a relief work" as used herein is directed to generally mean a carving or raised work embossed in a plane with a partial solid or three-dimensional appearance.

For the production of a relief work, a third positive transparency is required to be prepared. The preparation of this third positive transparency is made in the following manner.

For example, referring to FIG. 5(I), an object 3 to be pictured is projected preliminarily with a screen 4*a* (see FIGS. 6(I) and (II)). Next, the object 3 is photographed by using the group of cameras $C_3$, $C_4$ and $C_5$ belonging to the stereophotographic apparatus 1. For convenience of description, the picture taken by the came $C_4$ is defined a first positive picture, and the pictures taken by the cameras $C_3$ and $C_5$ are defined a second positive picture, respectively.

In the following, the process of producing a relief work on the right half part of the object 3 for clarity of explanation.

Now, it is assumed that a reference plane GP which is perpendicular to a segment $\overline{C_4Y}$ defined by a phantom perpendicular Y and passing the lens of the camera $C_4$ in place of the object 3, and upon this plane a second positive picture taken by the camera $C_5$ is projected by using the projector 15.

Figure 3:
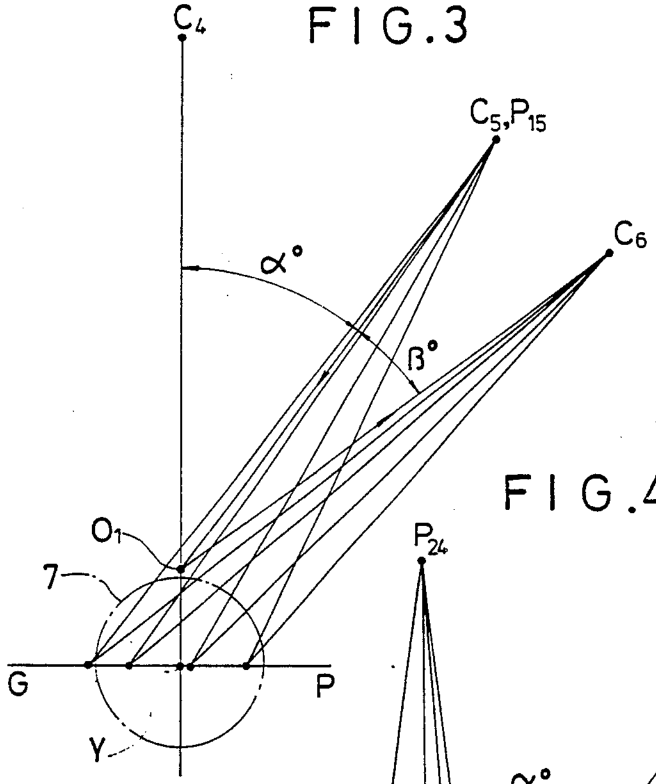

FIG. 3 shows the state that the second positive picture of the camera $C_5$ is projected by using the projector $P_{15}$.

Next, using a camera $C_6$ disposed at an angle $\beta$ degree centered at the point $O_1$, an optical image projected upon the reference plane GP from the projector $P_{15}$ is photographed. The picture taken by this camera $C_6$ may serve a third positive picture used for the production of the normal life-size relief work.

For the preparation of a relief work reduced to a certain scale in this embodiment of the invention, a further operation is required as follows.

In the case that a relief work is to be made on 50% down scale as in the case of a stereoscopic sculptural work, it is required that the normal third positive picture prepared in the foregoing step is reduced to be a half scale or 50% smaller accordingly to the required scale of reduction noted above (hereinafter, this reduced positive picture is referred to as "a reduced third positive" for clarity).

In the like manner, the first positive picture as taken by the camera $C_4$ is reduced to be a half scale or 50% smaller in accordance with the required scale of reduction (hereinafter, this is referred to as "reduced first positive").

Figure 4:
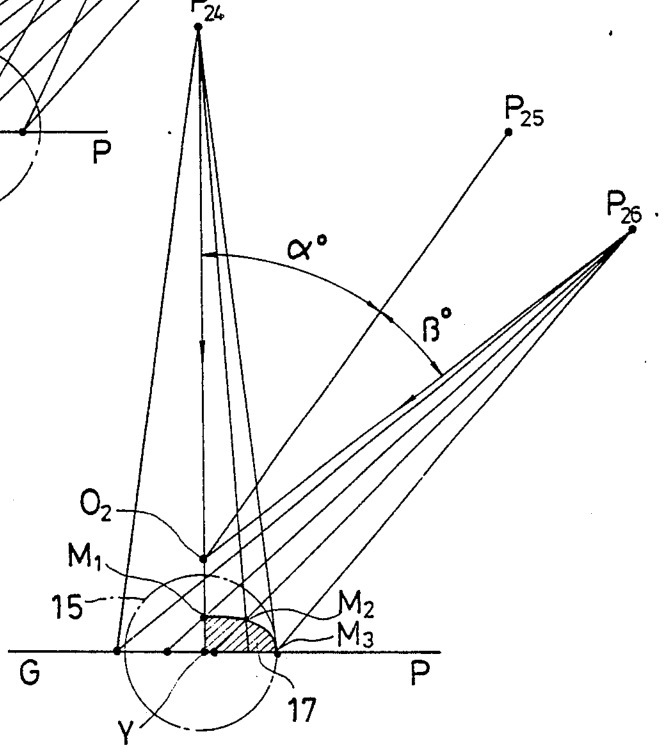

Then, thus-obtained reduced first and third positives are loaded into the projectors $P_{24}$ and $P_{26}$ of the stereoscopic sculpture production apparatus 12 to be projected upon the reference plane, and this state is shown in FIG. 4.

As shown typically in FIG. 4, firstly placed is a mass of material such as clay upon the reference plane GP, and then, a projector $P_{26}$ loaded with the third positive is operated to throw overlapping patterns of parallel lines or stripes onto the reference plane in such a manner that there are seen a plurality of crossings $M_1$, $M_2$, $M_3$, defined with the parallel lines projected from the projector $C_{26}$ on the surface of the mass of clay, and the operator or sculptor may shape or model the mass by adding or removing clay to make proper striped patterns so as to obtain a 50% down-scaled relief work 17 on the reference plane GP, accordingly.

While the foregoing description referred to the relief modeling work only on the right half side of the work 17, it may be effected equally in the entirely symmetrical manner on the left half part thereof with the employment of the cameras $C_3$, $C_2$ in place of those $C_5$, $C_6$ and of the projectors $P_{22}$ in place of the one $P_{26}$, respectively.

There may be attained many equally advantageous effects available from the compactness of the sculpture production arrangement and the projectors therefor in the manufacture of a reduced relief work, which is exactly like in the case of producing a reduced stereoscopic sculptural work.

While it was described in connection with the stereoscopic sculpture production process that a third positive picture was prepared to a desired scale of reduction so as to form a reduced third positive, this invention is not restricted in use to this embodiment, but a reduced second positive may of course be processed to obtain a reduced third positive, accordingly.

It is an essential matter to the invention in the production of a relief work to obtain a reduced third positive transparency, which may be understood readily when considering the presentation on the embodiment noted above to obtain a reduced third positive, and also which may be adapted equally with ease to another art relating to the production of a relief work such as disclosed in Japanese Patent Nos. 320,203 and 1,076,791, and the like, and therefore, no further explanation is given on such applications.

As stated fully hereinbefore, according to the method of and apparatus for producing a stereoscopic sculptural work according to the present invention, as it is possible in practice to make the distance "b" from the projector lens to the mass of material smaller in accordance with a desired scale of reduction in the production of a sculptural work, the dimensions of such projectors may be made smaller in size, thus making smaller the entire arrangement for producing a sculptural work, accordingly, and thus making the transportation of the entire arrangement so easier than the conventional arrangement.

As stated also hereinbefore, since each of the projectors may be made smaller in size, they may not project outwardly from the extension of the frame structure, and there is no obstruction to the operator's manual operations by reaching from the outside of the frame structure in the production of a sculpture work on a reduced scale, thus effecting a substantial efficiency in the production work of such a down-scaled sculpture, accordingly.

Furthermore, nothing that the distance of "b" as observed in connection with the disposition of each of the projectors become a value which may reduce at the same rate in accordance with a desired scale of reduction in the production of a sculptural work according to the present invention, it is an easy job to adjust the location of such projectors when installed onto the frame structure.

In addition, according to the present invention, as the ratio "c" with respect to the distance "b" in a given projector is constant, the scale of reduction of a positive transparency to be loaded into such projectors may turn to be constant, thus making it possible to commonly use positives of the same scale of recution, and thus making easier the preparation of such positives in the sculptural work. From such standpoint, it is feasible in practice to improve the efficiency of sculptural work, accordingly.

Moreover, according to the present invention, there is attainable a better finish in the production of a stereoscopic sculptural work, free from an effect of becoming thinner than the actual original, thus contributing to an improvement in accuracy in finish of the work.

Furthermore, the process of this invention may equally be adapted to the production of a relief work, in which there may also be attained a similar advantageous effect to the case of stereoscopic sculptural work.

It is to be understood that the appended claims are intended to cover all of such generic and specific features particular to the invention as disclosed herein and all statements relating to the scope of the invention, which as a matter of language might be said to fall thereunder.

What is claimed is:

1. A process of producing works of sculpture on a desired reduced scale, comprising the steps of:

arranging a plurality of photographic cameras and arranging a plurality of optical projectors, each projector being loaded with a transparent screen having a plurality of parallel lines thereon, around an object to be photographed at a predetermined object distance; projecting the parallel lines of the transparent screen onto the object and photographing a striped pattern projected onto the object; arranging a second plurality of projectors around a mass of material to be molded, said second plurality of projectors having a reduced focal length and being positioned at an object distance proportional to the desired reduction scale; reducing photographic pictures taken by said cameras to obtain reduced scale pictures; projecting said reduced scale pictures by corresponding ones of said second plurality of projectors; and sculpting said mass of material to make the projected lines meet and coincide with each other to obtain a reduced scale sculpture.

2. An apparatus for producing works of sculpture on a desired reduced scale, comprising:

a plurality of photographic cameras; a plurality of optical projectors, each optical projector being loaded with a transparent screen having a plurality of parallel lines, centered on an object at a predetermined object distance; a second plurality of projectors spaced from a mass to be sculpted at an object distance from said mass proportional to a desired reduction scale, each of said second plurality of projectors having a reduced focal length; and, pictures reduced in scale by the desired reduction scale from pictures taken by said plurality of photographic cameras, for projection from said second plurality of projectors.

* * * * *